(12) United States Patent
Aso et al.

(10) Patent No.: US 9,088,201 B2
(45) Date of Patent: Jul. 21, 2015

(54) DRIVE GUIDE APPARATUS

(75) Inventors: Toshiyuki Aso, Tokyo (JP); Akihiro Unno, Tokyo (JP)

(73) Assignee: THK CO., LTD., Shinagawa-ku, Tokyo (JP)

( * ) Notice: Subject to any disclaimer, the term of this patent is extended or adjusted under 35 U.S.C. 154(b) by 373 days.

(21) Appl. No.: 12/593,435

(22) PCT Filed: Mar. 26, 2008

(86) PCT No.: PCT/JP2008/055676
§ 371 (c)(1),
(2), (4) Date: Sep. 28, 2009

(87) PCT Pub. No.: WO2008/123287
PCT Pub. Date: Oct. 16, 2008

(65) Prior Publication Data
US 2010/0060087 A1 Mar. 11, 2010

(30) Foreign Application Priority Data
Mar. 30, 2007 (JP) .................................. 2007-094551

(51) Int. Cl.
*H02K 41/02* (2006.01)
*H02K 9/22* (2006.01)

(52) U.S. Cl.
CPC . *H02K 41/02* (2013.01); *H02K 9/22* (2013.01)

(58) Field of Classification Search
CPC ............ H02K 5/18; H02K 9/22; H02K 41/02
USPC ........................................... 310/12.29, 64–65
See application file for complete search history.

(56) References Cited

U.S. PATENT DOCUMENTS

| 5,864,187 | A | * | 1/1999 | Gonzalez .................... 310/12.29 |
| 7,622,832 | B2 | | 11/2009 | Moriyama |
| 2004/0256918 | A1 | * | 12/2004 | Beakley ........................... 310/12 |
| 2006/0049700 | A1 | * | 3/2006 | Moriyama ....................... 310/12 |
| 2006/0232141 | A1 | * | 10/2006 | Teramachi et al. ............. 310/12 |

FOREIGN PATENT DOCUMENTS

| JP | 6-260541 A | 9/1994 |
| JP | 2001-112210 A | 4/2001 |
| JP | 2004-088981 A | 3/2004 |

(Continued)

OTHER PUBLICATIONS

Miyamoto et al, JP 2004289911 Machine Translation,Oct. 2004.*

(Continued)

*Primary Examiner* — Quyen Leung
*Assistant Examiner* — Eric Johnson
(74) *Attorney, Agent, or Firm* — Westerman, Hattori, Daniels & Adrian, LLP

(57) ABSTRACT

A drive guide device capable of effectively releasing heat produced by a mover. The drive guide device has a movement unit 100 moved by a linear motor while being guided by a rail 230. The movement unit 100 has the mover 140 to which electricity is conducted to produce a magnetic field, a table 110 placed on the mover 140 on the opposite side of a base 210 to which the rail 230 is fixed, a heat sink 130 having heat radiation fins for releasing heat produced by the mover 140 and placed between the mover 140 and the table 110, and a heat transmission route for transmitting heat, which cannot be released by the heat sink 130, to the table 110. The table 110 is made from a material having a low thermal expansion coefficient.

4 Claims, 10 Drawing Sheets

(56) References Cited

FOREIGN PATENT DOCUMENTS

| JP | 2004-289911 A | 10/2004 |
|---|---|---|
| JP | 2004-312983 A | 11/2004 |
| JP | 2004-320879 A | 11/2004 |
| JP | 2005-79368 A | 3/2005 |

OTHER PUBLICATIONS

Tanaka, JP 2005079368 Machine Translation, Mar. 2005.*
Amagasa, JP 2004320879 Machine Translation, Nov. 2004.*

International Preliminary Report on Patentability (Form PCT/IB/373) of International Application No. PCT/JP2008/055676, with form PCT/ISA/237, Issue date of Oct. 13, 2009.
International Search Report of PCT/JP2008/055676, mailing date of Jun. 24, 2008.
Japanese Office Action dated Nov. 6, 2012, issued in corresponding Japanese Patent Application No. 2009-509134, w/ English translation, (10 pages).
Taiwanese Office Action dated Aug. 9, 2013, issued in corresponding Taiwanese Patent Application No. 097111329.

* cited by examiner

DRIVE GUIDE APPARATUS

TECHNICAL FIELD

The present invention relates to a drive guide apparatus driven by a linear motor.

BACKGROUND ART

Conventionally, a drive guide apparatus having a movement unit which moves relative to a base provided with a guide is known. An apparatus using a linear motor as a drive source of a movement unit is also known. Patent document 1 discloses the configuration of a drive guide apparatus using a linear motor as a drive source.

The drive guide apparatus using a linear motor as a drive source has, in the movement unit, a mover which generates a magnetic field when energized. The apparatus also has a stator having a magnet in a portion facing the mover in the base.

By the configuration, the mover is energized and magnetic interaction occurs between the mover and the stator, so that the movement unit can move relative to the base.

With the configuration, the movement unit moves in a state where the mover and the stator are not in contact, so that noise, vibration, and the like can be reduced. Further, since no friction occurs between the mover and the stator, the accelerating performance of the movement unit can be improved.

FIG. 10 illustrates a schematic configuration of a conventional drive guide apparatus. As shown in FIG. 10, the drive guide apparatus has a movement unit 100 constructed by a table 110, movement blocks 120, and a mover 140. A base 210 is provided with a stator 220.

In the base 210, rails 230 (guides) for guiding movement of the movement unit 100 are fixed, and the movement blocks 120 provided for the movement unit 100 is attached to the rails 230.

The movement block 120 is attached to the rail 230 in a state where a certain degree of a preload is applied generally via a rolling member such as a ball or a roller.

The action of applying a preload to the movement block 120 via the rolling member is taken in order to prevent occurrence of backlash between the movement block 120 and the rail 230.

The movement unit 100 further has a heat sink 130 between the mover 140 and the table 110 as shown in FIG. 10. A plurality of heat radiation fins 150 is formed on the heat sink 130.

The heat radiation fins 150 are provided to prevent transmission of heat generated from the mover 140 to the table 110 at the time of making the movement unit 100 move by passing current to the mover 140.

Specifically, if the heat generated by the mover 140 at the time of passing current to the mover 140 is transmitted to the table 110, thermal expansion occurs and the table 110 is deformed. When the table 110 is deformed, the table 110 is curved and the attachment state between the movement blocks 120 and the rails 230 becomes unstable.

As a result, a backlash occurs between the movement blocks 120 and the rails 230, vibration and noise occur, and the life of the drive guide apparatus is shortened.

According to the conventional technique, to prevent heat generated by the mover 140 from being transmitted to the table 110, a heat insulating material 400 is provided between the table 110 and the mover 140.

Further, the heat radiation fins 150 are provided between the mover 140 and the table 110, and heat generated by the mover 140 is radiated by the heat radiation fins 150.

Patent document 1: Japanese Patent Application Laid-Open No. 2004-88981

DISCLOSURE OF THE INVENTION

Problems to be Solved by the Invention

However, when the mover 140 which generates a larger magnetic field is used in order to increase, for example, thrust of the movement unit 100, the amount of heat generated by the mover 140 increases. With the conventional configuration, the heat cannot be sufficiently insulated or radiated.

As described above, when heat is transmitted to the table 110 and thermal expansion occurs in the table 110, the attachment state between the movement blocks 120 and the rails 230 becomes unstable, a backlash occurs between the movement blocks 120 and the rails 230, vibration and noise occur, and the life of the drive guide apparatus is shortened.

The present invention is achieved in consideration of such actual conditions and an object of the invention is to provide a drive guide apparatus using a linear motor as a drive source, capable of effectively radiating heat generated by a mover. Another object is to provide a drive guide apparatus having large thrust yet with a compact configuration.

Means for Solving the Problems

To achieve the objects, the present invention provides a drive guide apparatus having a movement unit which moves by being guided along a guide, by a linear motor, the movement unit including a movable element for generating a magnetic field when energized, and a table provided on the side opposite to a base to which the guide is fixed, of the movable element, and the apparatus having, between the movable element and the table, a radiating structure for radiating heat generated by the movable element, wherein a heat transmission route for transmitting heat which cannot be released in the radiating structure to the table is provided, and the table is made of a material having a low thermal expansion coefficient.

With the configuration, heat which cannot be released in the radiating structure between the mover and the table is transmitted to the table via the heat transmission path. The heat transmitted to the table is radiated by the table, so that the heat radiation amount can be increased.

Although heat is transmitted to the table, since a material having a low thermal expansion coefficient is used for the table, the thermal expansion of the table which occurs when heat is transmitted to the table can be reduced.

The radiating structure may be a heat sink having a plurality of fins provided between the table and the mover.

With the configuration, by the plurality of fins provided for the heat sink, the heat generated by the mover can be radiated.

The heat sink may be fixed to the under face of the table, and the heat transmission route may be formed so as to pass a part where the heat sink is fixed.

Preferably, the table is made of a material having a thermal expansion coefficient of $10.0 \times (10^{-6}/K)$ or less.

With the configuration, the thermal expansion of the table which occurs when the heat generated by the mover is transmitted to the table can be reduced.

Preferably, a black surface process is performed on the table.

With the configuration, by heat radiation from the surface of the table, the heat can be effectively radiated.

In the heat sink, preferably, walls are formed in three places; both ends in the width direction and a center portion, the top face of each of the walls is fixed to the under face of the table, and a plurality of fins shorter than the walls are provided between the walls in parallel with the walls.

Effects of the Invention

As described above, according to the present invention, heat, which cannot be released in the radiating structure, provided between the mover and the table can be effectively radiated from the table by making the heat transmitted to the table via the heat transmission route. Therefore, the drive guide apparatus capable of effectively radiating heat generated by the mover can be provided.

Figure 1:
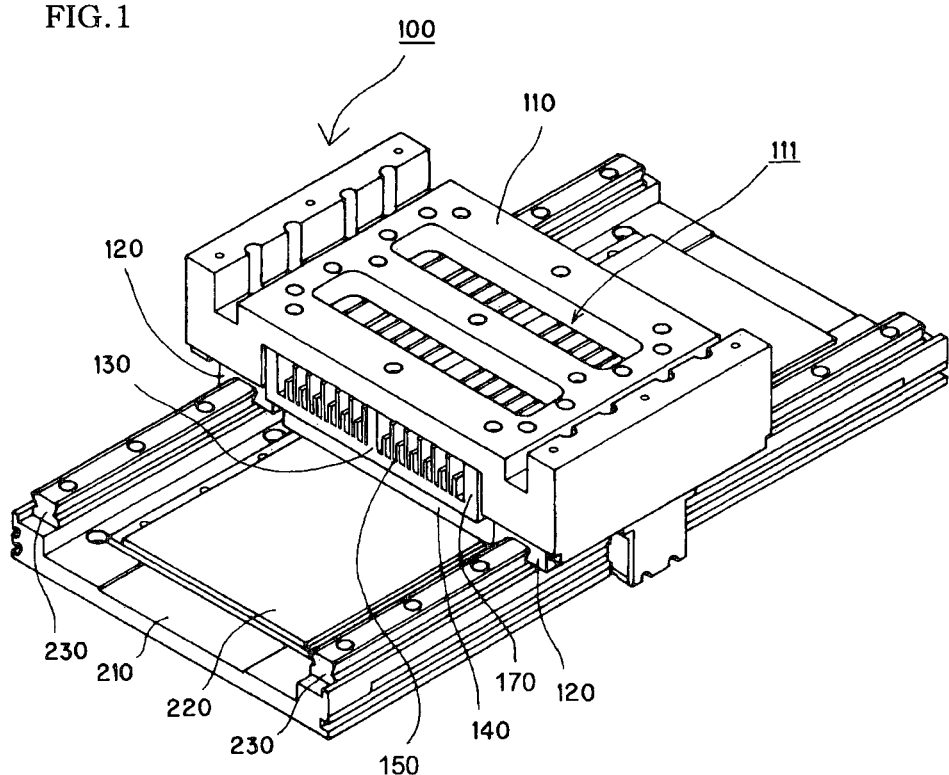
FIG. 1 is a perspective view of a drive guide apparatus according to an embodiment of the present invention.

REFERENCE NUMERALS 100 movement unit 110 table 111 hole 120 movement block 121 load rolling groove 122 spacer 125 seal member 126 seal member 130 heat sink 140 mover 150 heat radiation fins 151 first heat radiation fin 152 second heat radiation fin 210 base 220 stator 400 heat insulating material

BEST MODE FOR CARRYING OUT THE INVENTION

With reference to the drawings, best modes for carrying out the present invention will be illustratively and specifically described based on an embodiment. The scope of the present invention is not limited only to dimensions, materials, shapes, relative disposition, and the like of component parts described in the embodiment unless otherwise specifically described.

A drive guide apparatus according to an embodiment of the present invention will be described below with reference to FIGS. 1 to 9.

[Configuration of Movement Unit and Base]

Figure 2:
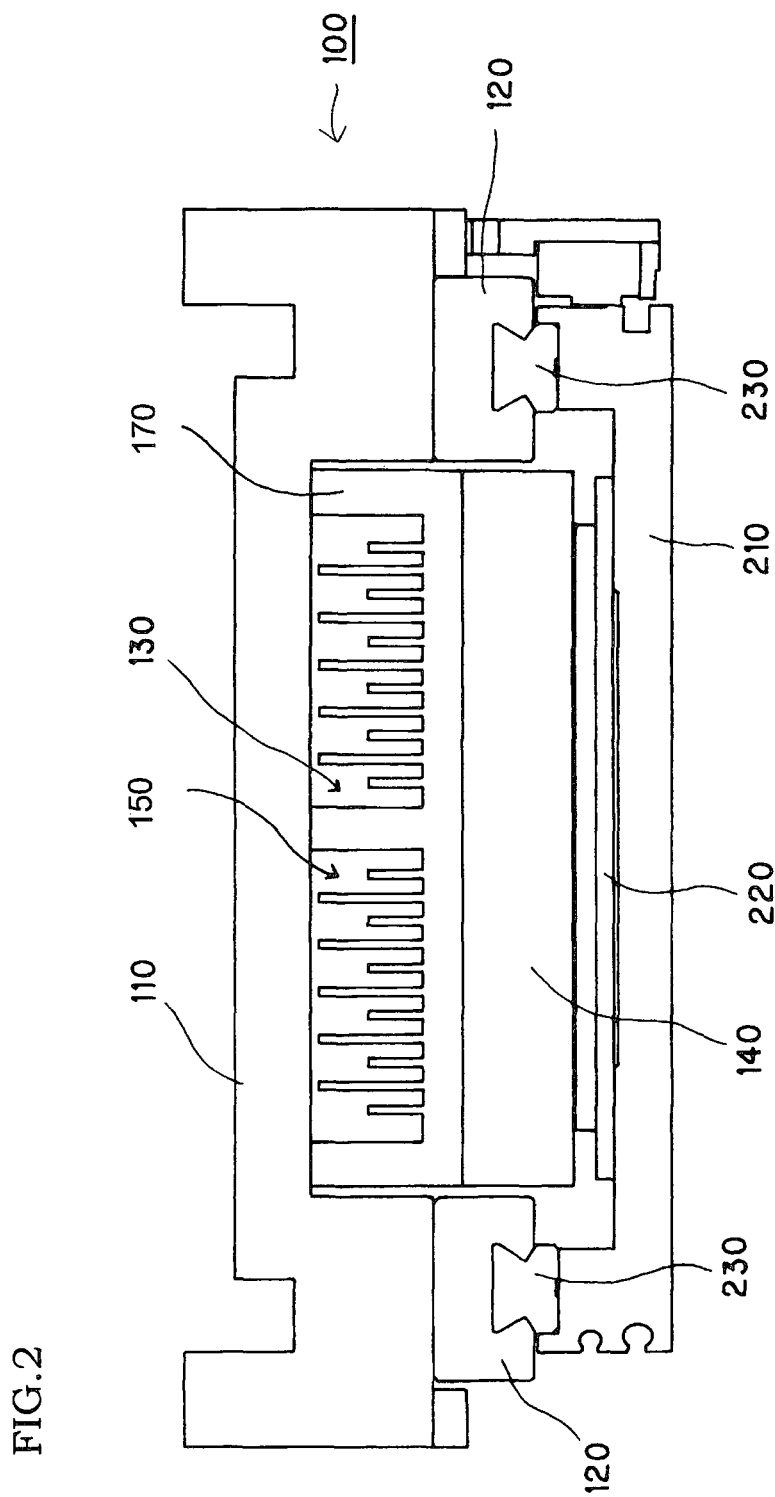
FIG. 2 is a front view of the drive guide apparatus according to the embodiment.

FIGS. 1 and 2 show a schematic configuration of a drive guide apparatus according to an embodiment. FIG. 1 is a perspective view of a schematic configuration of a drive guide apparatus according to an embodiment of the present invention. FIG. 2 is a schematic configuration diagram in a section of the drive guide apparatus according to the embodiment.

As shown in FIGS. 1 and 2, a drive guide apparatus according to the embodiment has the movement unit 100 and the base 210 to which the rails 230 as guides for guiding the travel direction of the movement unit 100 are fixed.

The movement unit 100 has the mover 140 which generates a magnetic field when energized, the table 110, and the movement block 120.

The mover 140 has an armature core and an armature coil which are not shown. Between the mover 140 and the table 110, the heat sink 130 provided with the plurality of heat radiation fins 150 is provided. The configuration of the heat sink 130 provided with the heat radiation fins will be described later.

The mover 140 is provided on the under face of the heat sink 130, and the plurality of heat radiation fins 150 are provided on the top face of the heat sink 130. Further, walls 170 (heat transmission routes) are provided in three places; both ends of the heat sink 130 and a center part of the heat sink 130. The top face of each of the walls 170 is fixed to the under face of the table 110 by bolts or the like.

By the fixed parts, the heat transmission routes of the table 110 and the heat sink 130 are formed. At each of both ends in the width direction of the table 110, the movement block 120 is provided.

On the other hand, to the base 210, as a guide for guiding the movement of the movement block 120, a pair of rails 230 is fixed in parallel to each other. The base 210 is also provided with the stator 220 having a magnet or the like in a part facing the mover 140. Between the stator 220 and the mover 140, a gap is provided.

Since the movement blocks 120 are attached to the rails 230, the movement unit 100 is movable along the rails 230. The configuration and the like of the attachment part of the movement block 120 and the rail 230 will be described later.

In the drive guide apparatus constructed as described above, when the mover 140 is energized by a not-shown power source, the mover 140 generates a magnetic field. By the magnetic interaction with the magnetic field generated by the stator 220, the movement unit 100 provided with the mover 140 moves along the rails 230.

Specifically, in the drive guide apparatus in the embodiment, by a linear motor constructed by the mover 140 and the stator 220, the movement unit 100 moves relative to the base 210.

[Configuration of Attachment Part of Movement Block and Rail]

Figure 3:
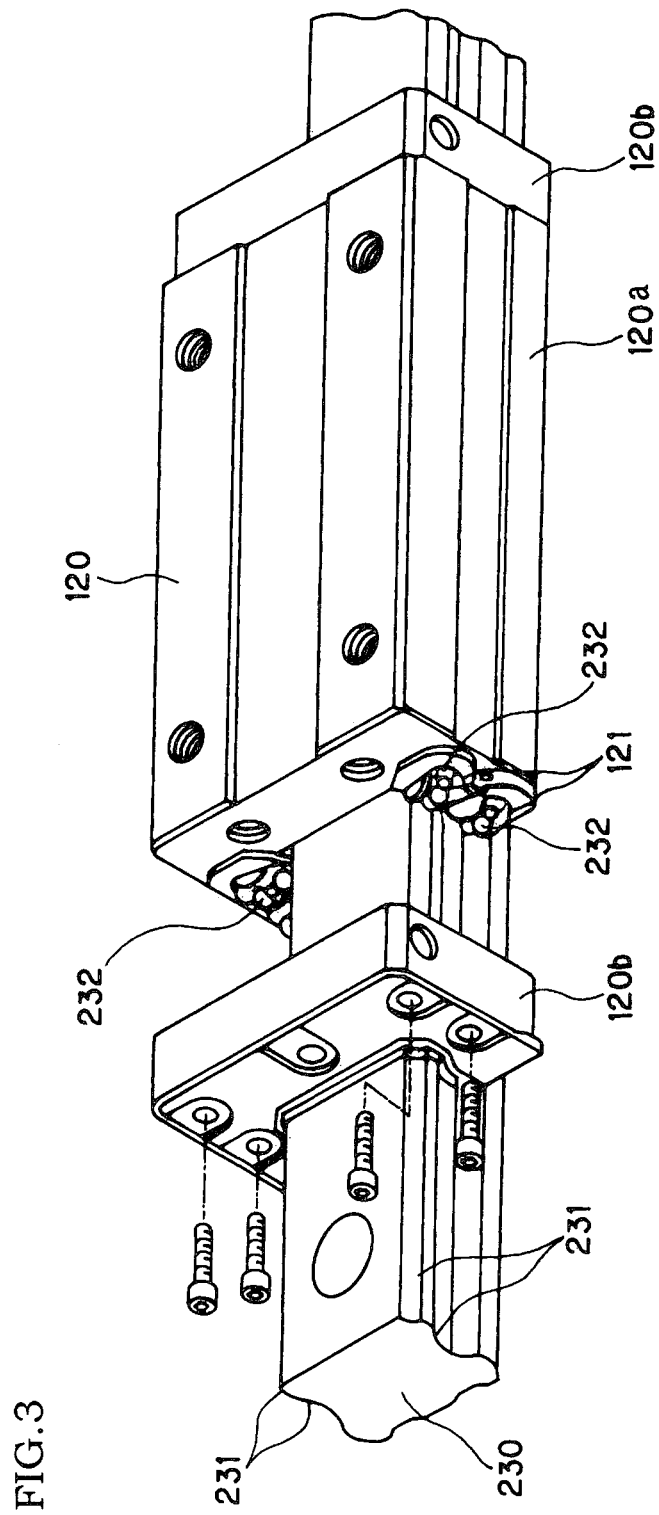
FIG. 3 is a configuration diagram showing attachment between a guide and a movement block in the embodiment.
Figure 4:
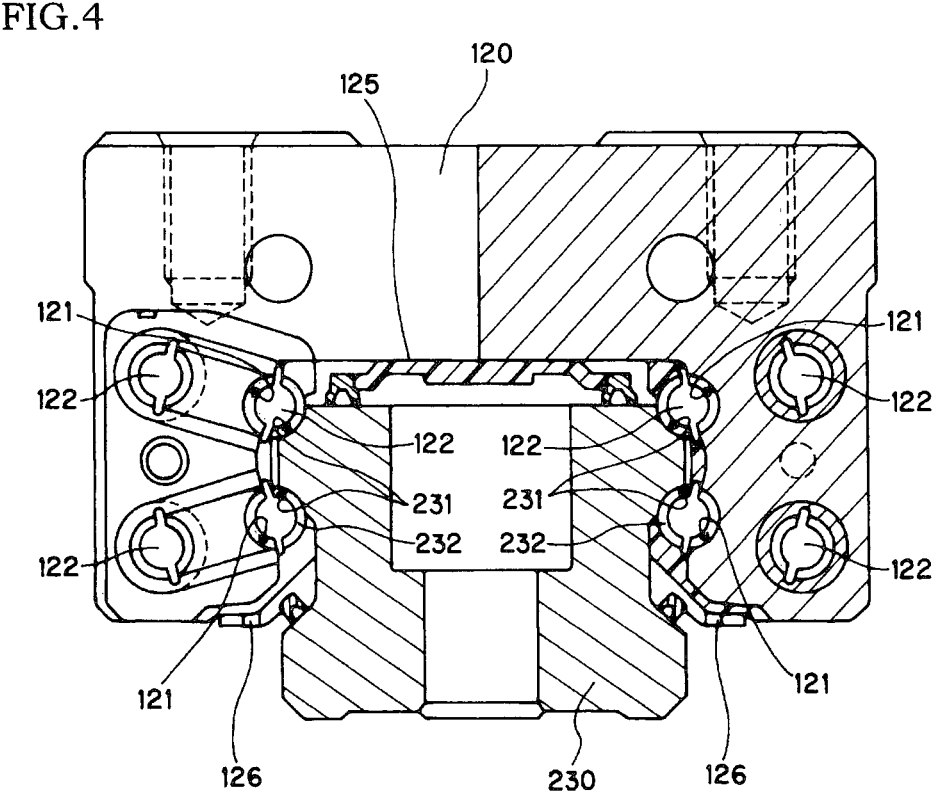
FIG. 4 is a configuration diagram showing attachment between a guide and a movement block in the embodiment.
Figure 5:
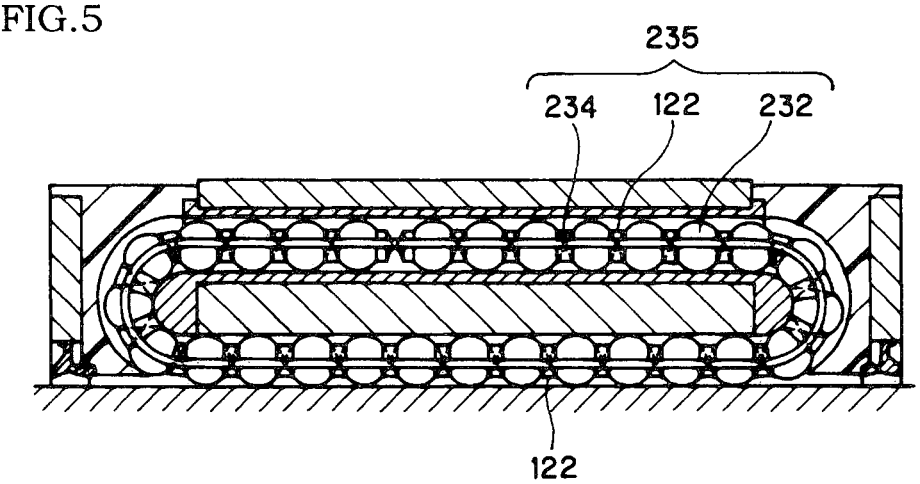
FIG. 5 is a schematic configuration diagram of a movement block in the embodiment.

In the embodiment, by interposing a rolling Member (such as a ball or roller) between the movement block 120 and the rail 230, the movement block 120 can move by being guided along the rail 230. With reference to FIGS. 3 to 5, the attachment part of the movement block 120 and the rail 230 will be described. As an example of the rolling member, a ball is used.

As shown in FIG. 4, two ball rolling grooves 231 as rolling member rolling faces are formed in each of right and left side faces of the rail 230 along the longitudinal direction of the rail 230. On the other hand, in the movement block 120, an endless cyclic path including load rolling grooves 121 serving as load rolling member rolling paths facing the ball rolling grooves 231 is formed.

In the endless cyclic path, a plurality of balls 232 which roll and circulate between the ball rolling grooves 231 and the load rolling grooves 121 with the movement of the movement block 120 relative to the rail 230 are arranged and housed.

As shown in FIG. 3, the movement block 120 includes: a movement block body 120a having the load rolling groove 121 and a ball return path which is parallel to the load rolling groove 121; and a pair of end caps 120b coupled to both ends of the movement block body 120a. The end cap 120b couples the load rolling groove 121 and the ball return path.

The load rolling groove 121 formed in the movement block 120 is formed so as to face each ball rolling groove 231 formed in the rail 230. The plurality of balls 232 are sandwiched between the load rolling member 121 and the ball rolling groove 231.

With movement of the movement block 120, the plurality of balls 232 are sent to the ball return path via a direction change path formed in the end cap 120b, are guided again to the load rolling groove 121, and circulate in the endless cyclic path.

As shown in FIG. 5, the plurality of balls 232 is rotatably held by a holding member 235. The holding member 235 is constructed by spacers 122 disposed alternately with the balls 232 and a belt 234 having flexibility and a thin plate shape and connecting the spacers 122.

As shown in FIG. 4, a seal member 125 is provided between the top face of the rail 230 and the movement block 120, and a seal member 126 is provided between a side face of the rail 230 and the movement block 120.

The seal members 125 and 126 are provided to prevent leakage of a lubricant filled between the ball rolling groove 231 and the load rolling groove 121 to the outside, or invasion of dusts from the outside.

Although the configuration of movement between the rail 230 and the movement block 120 via the rolling member (balls or rollers) such as balls has been described above, the configuration of the drive guide apparatus in the embodiment is not limited to the above-described configuration. Alternatively, a configuration that both of the rail 230 and the movement block 120 slide may be employed.

Figure 8:
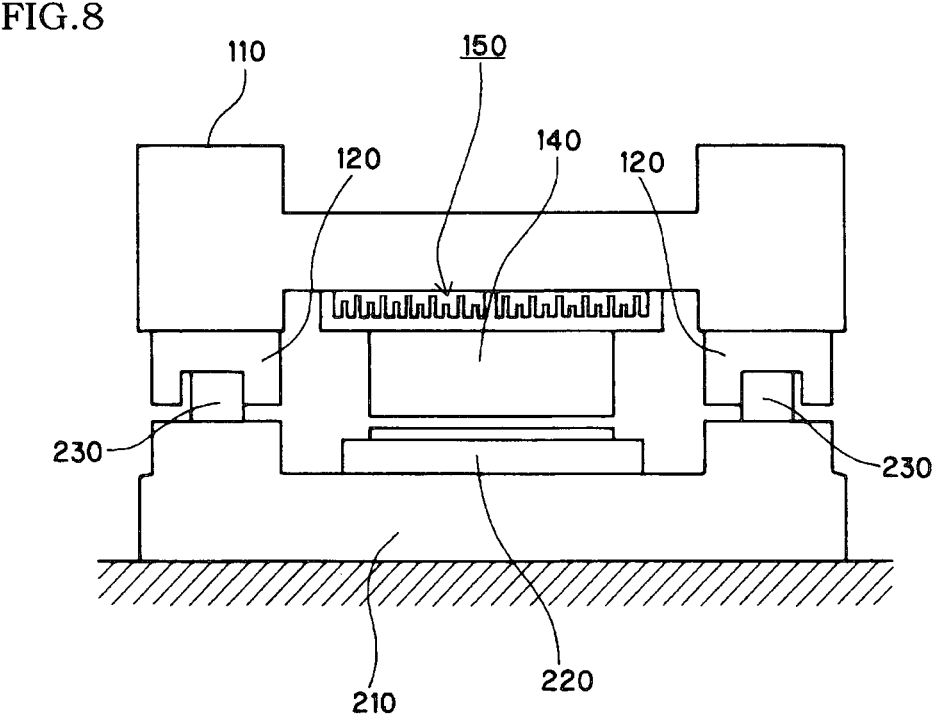
FIG. 8 is a schematic configuration diagram of a drive guide apparatus having a guide mechanism of a sliding guide.

FIG. 8 illustrates a drive guide apparatus of a sliding type.

As shown in FIG. 8, the drive guide apparatus of the sliding type has the rails 230 each having rectangular shape in cross section, and the movement blocks 120 each attached over the rail 230 so as to be movable relative to the rail 230 and on which the table 110 is attached.

No rolling members are provided between the rail 230 and the movement block 120, but the rail 230 and the movement block 120 move indirect contact with each other.

[Configuration of Heat Radiation Fin]

Figure 6:
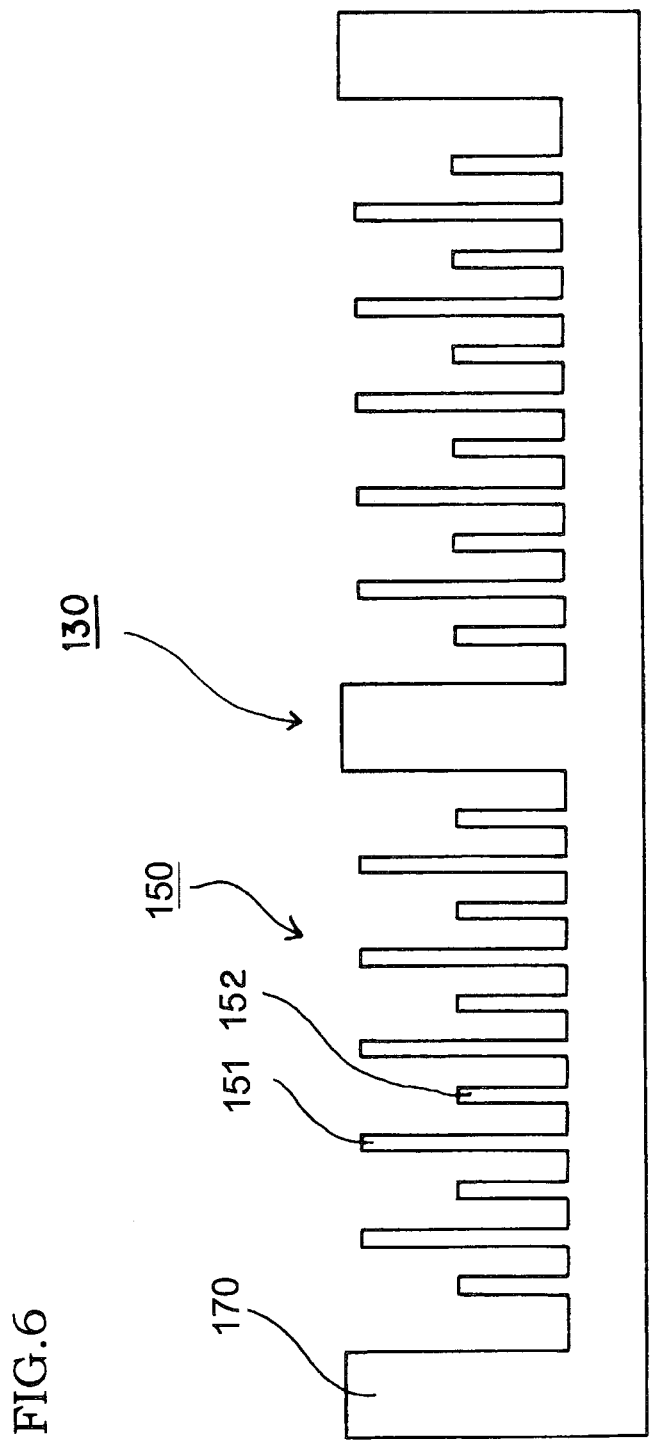
FIG. 6 is a front view of heat radiation fins in the embodiment.
Figure 7:
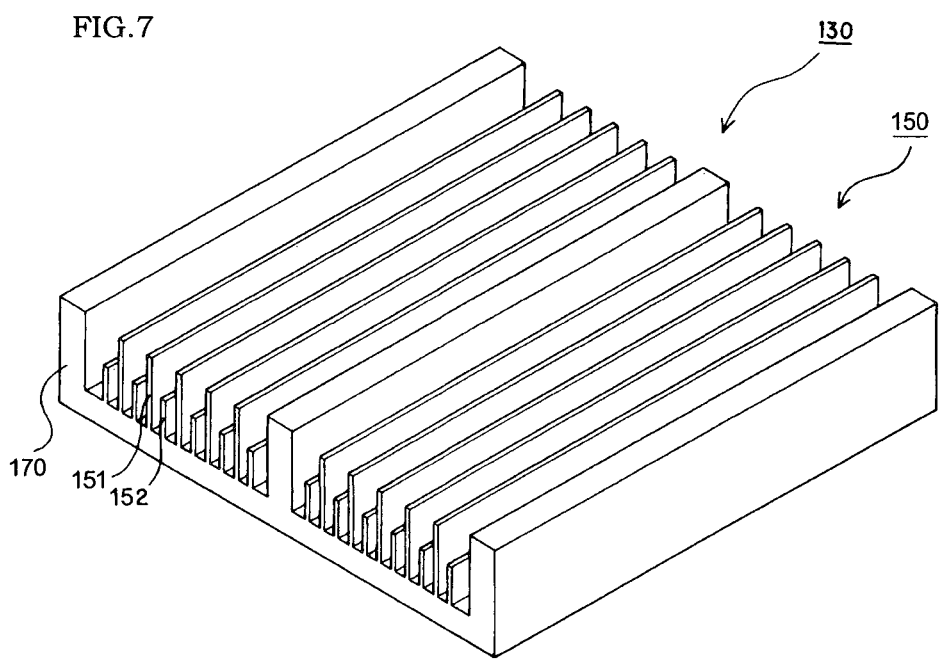
FIG. 7 is a perspective view of the heat radiation fins in the embodiment.

FIGS. 6 and 7 are enlarged views of the attachment part of the heat radiation fins 150 in the drive guide apparatus according to the embodiment shown in FIGS. 1 and 2.

As shown in FIGS. 6 and 7, in the drive guide apparatus constructed as described above, the heat radiation fins 150 for radiating heat generated when the mover 140 is energized is provided.

Concretely, on the top face of the heat sink 130, a plurality of heat radiation fins 150 are provided. In the embodiment, the heat radiation fins 150 include a first heat radiation fin 151 and a second heat radiation fin 152 having heights different from each other.

Further, the first heat radiation fins (taller fins) 151 and the second heat radiation fins (shorter fins) 152 are provided alternately. The heat radiation fins 150 are arranged in parallel to the travel direction of the movement unit 100.

The first heat radiation fin 151 is formed to be tallest so that its surface area becomes large. On the other hand, considering dimension tolerance and the like, the height is set so that the top face of the first heat radiation fin 151 does not come into contact with the under face of the table 110.

Next, the mechanism of heat radiation will be described. First, heat generated by the mover 140 as the linear motor is driven is transmitted to the heat sink 130 with the heat radiation fins described above. The heat sink 130 with the heat radiation fins, having a known configuration such that, for example, a heat pipe is disposed on the inside is used.

The heat transmitted to the heat sink 130 is radiated from the heat radiation fins 150 provided on the heat sink 130. As shown in FIGS. 6 and 7, the second fins (shorter fins) are provided alternately with the first fins (taller fins).

Generally, as a method of increasing the heat radiation efficiency of a heat radiation fin, it is considered to increase the surface area of a heat radiation fin. Particularly, in the case where a plurality of heat radiation fins are disposed in parallel, by increasing the total surface area of the entire heat radiation fin, the heat radiation efficiency can be increased.

Concretely, increase in the surface area by enlarging each heat radiation fin, increase in the number of heat radiation fins per unit length by narrowing the gap between the heat radiation fins arranged, and the like can be considered. In those methods, however, convection of air in the spaces between the heat radiation fins is not easy.

In the embodiment, therefore, between the neighboring first heat radiation fins 151, the second heat radiation fin 152 shorter than the first heat radiation fins 151 is provided.

With the configuration, first, the area of the heat radiation faces can be assured by the taller first heat radiation fins 151. Further, by installing the second heat radiation fin 152 between the neighboring first heat radiation fins 151, a space in which air convection occurs between the neighboring first heat radiation fins 151 can be assured.

As a result, while increasing the number of heat radiation fins per unit length by narrowing the interval between the heat radiation fins, the space in which air convection occurs between neighboring heat radiation fins can be assured, and the heat radiation efficiency can be increased.

The top faces of the walls 170 (heat transmission routes) provided for the heat sink 130 with the heat radiation fins are fixed to the under face of the table 110. As shown in FIG. 6, the embodiment employs the configuration that the walls 170 are provided in three places which are at both ends and the center of the table 110.

With the configuration, using each of the walls 170 as a heat transmission route, heat can be transmitted from the heat sink 130 to the table 110.

By making the heights of the first heat radiation fin 151 and the second heat radiation fin 152 lower than the top face of the wall 170, the top faces of the first and second heat radiation fins 151 and 152 are not in contact with the under face of the table 110.

[Configuration of Table]

Figure 9:
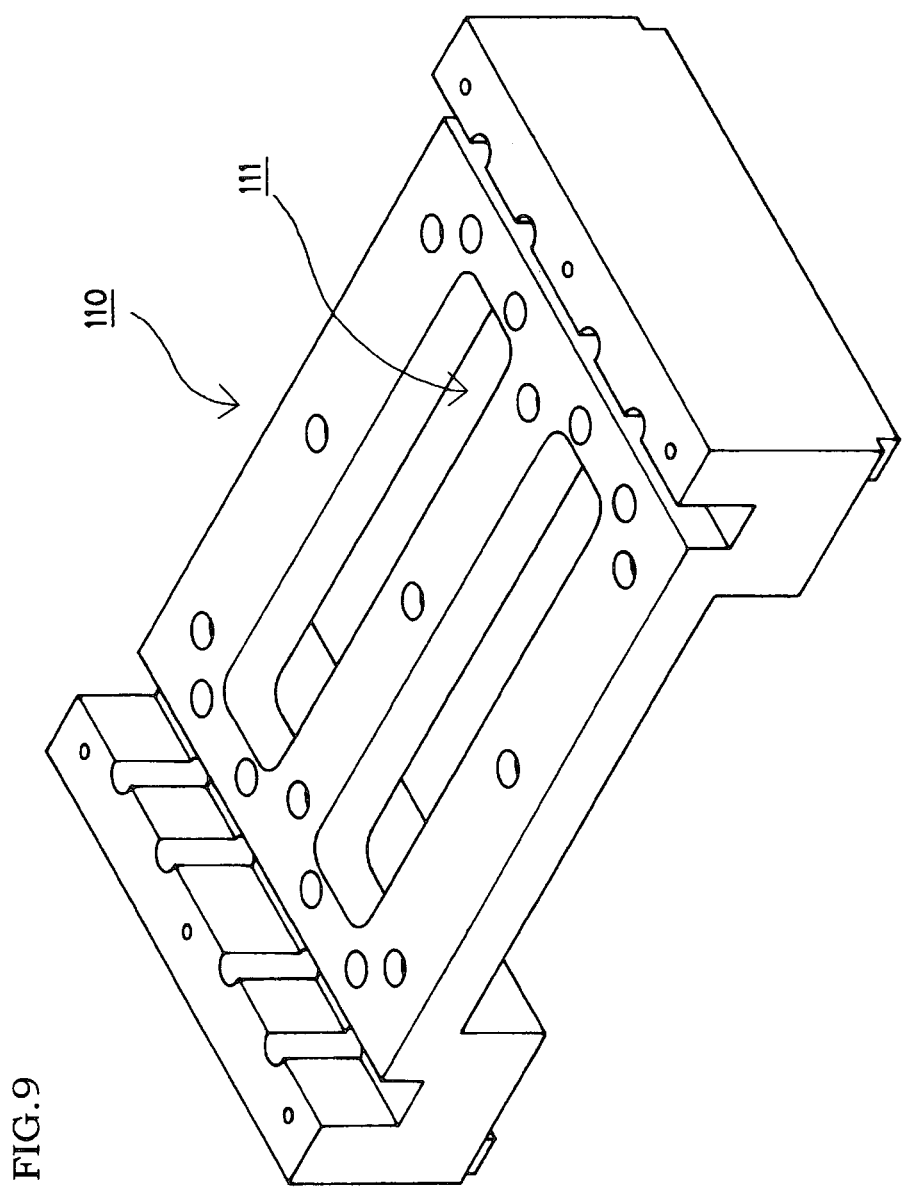
FIG. 9 is a perspective view of a table in the embodiment.
Figure 10:
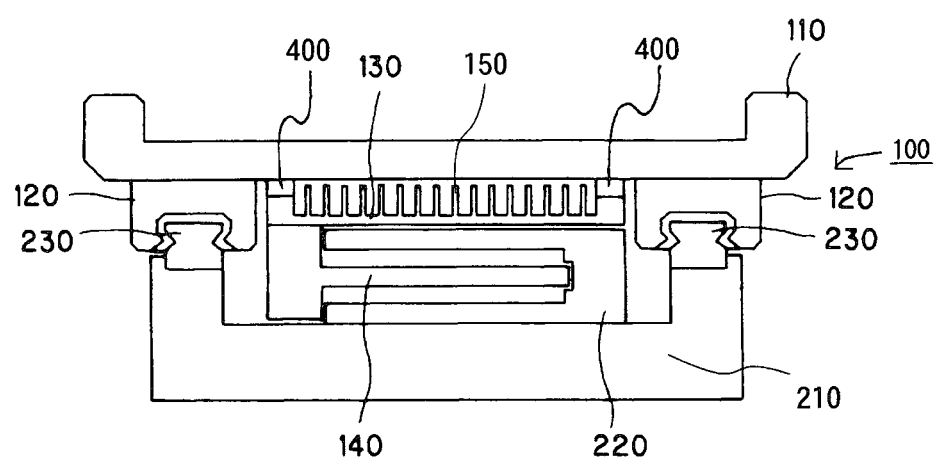
FIG. 10 is a schematic configuration diagram of a drive guide apparatus according to a conventional technique.

As shown in FIG. 9, in the embodiment, to further improve the heat radiation efficiency of the heat radiation fin 150, a hole 111 is formed in a part facing the heat radiation fins 150 in the table 110.

With the configuration, by forming the hole 111 in a part facing the heat radiation fins 150 in the table 110, heat radiated from the heat radiation fins 150 is easily escaped via the hole 111 to the outside of the table 110.

As a result, the amount of heat radiated from the heat radiation fins 150 increases. Since the hole 111 is formed in the table 110, reduction in the weight of the table 110 is also possible.

By forming the hole 111 in a long hole shape, bias in the heat distribution in the width direction of the table 110 can be suppressed.

To increase the thrust of the movement unit in the drive guide apparatus, the magnetic field has to be increased. For this purpose, the number of coils has to be increased and the coil has to be made larger.

Consequently, at least one of the height, length, and width has to be increased. However, when the height is increased, the movement unit 100 becomes taller.

When the length is increased, the length in the travel direction of the movement unit 100 increases, so that the travel range of the movement unit 100 is narrowed by the amount of the increased length.

As described above, when the height and length are regulated, the width of the table 110 has to be increased in order to increase the thrust of the movement unit 100.

As a result, the dimension in the width direction of the mover 140 and the table 110 increases. When the dimension in the width direction of the mover 140 and the table 110 increases, an amount of downward deflection with respect to the movement block 120 of the table 110 as a fulcrum increases due to the magnetic attractive force or the like of the mover 140 and the stator 220.

Particularly, in the case of providing the long hole 111 in the table 110 and in the case where the long hole has a shape which is long in the travel direction of the table 110, the deflection amount of the table 110 becomes large.

However, by making the long hole in the shape which is long in the direction orthogonal to the travel direction of the table 110 as in the embodiment, the deflection amount of the table 110 can be reduced more than the case where the long hole is formed in the shape long in the travel direction of the table 110.

In the embodiment, to effectively radiate the heat transmitted to the table 110, a black surface process is performed on the surface of the table 110.

Further, in the embodiment, in order to suppress the thermal expansion amount of the table 110 even in the case where heat is transmitted to the table 110, not a conventional aluminum alloy (thermal expansion coefficient of $1.9 \times 10^{-5}$/K to $2.3 \times 10^{-5}$/K) and iron (thermal expansion coefficient of $1.1 \times 10^{-5}$/K to $1.2 \times 10^{-5}$/K), NOBINITE cast iron (registered trademark) CD-5 (thermal expansion coefficient of $2.5 \times 10^{-6}$/K to $3.5 \times 10^{-6}$/K) manufactured Enomoto Chukousho Co., Ltd. is used for the table 110.

With the configuration, in the case where heat, which cannot be released by the heat radiation fins 150, is transmitted to the table 110, the thermal expansion amount of the table 110 can be reduced. That is, while radiating the heat, which cannot be released by the heat radiation fins 150, by the table 110, the thermal expansion of the table 110 can be suppressed.

When a heat insulating material is sandwiched between the mover 140 and the table 110 like in the conventional technique, since rigidity of the heat insulating material is generally low, the strength of the apparatus body becomes insufficient. However, since the embodiment does not employ the configuration that the heat insulating material is provided between the mover 140 and the table 110, the strength of the apparatus body can be improved.

Other Embodiments

Although the first heat radiation fins 151 and the second heat radiation fins 152 are alternately disposed in the above, another configuration may be employed that a plurality of heat radiation fins 152 are provided between the neighboring first heat radiation fins 151. Concretely, a configuration such that two second heat radiation fins 152 are provided between the neighboring first heat radiation fins 151 can be employed.

In the above, the heat radiation fins 150 include two kinds of heat radiation fins (the first heat radiation fins 151 and the second heat radiation fins 152). A configuration using a heat radiation fin whose height is different from the first and second heat radiation fins in addition to the first heat radiation fins 151 and the second heat radiation fins 152 may be employed. A configuration of performing the black surface process on the surface of the heat sink 130 in order to radiate the heat of the heat sink 130 more effectively may be employed.

The invention claimed is:

1. A drive guide apparatus comprising:
a pair of parallel guides;
a movement unit that moves by being guided along the pair of parallel guides by a linear motor; and
a table, wherein
the movement unit comprises:
a pair of movement blocks spaced apart in a direction orthogonal to a travel direction of the movement unit, each of the pair of movement blocks guided along each of the pair of parallel guides;
a movable element of the linear motor disposed between the pair of movement blocks for generating a magnetic field when energized; and
a heat sink disposed on the movable element configured to radiate heat generated by the movable element,
wherein the table is disposed on the heat sink and fixed to the pair of parallel guides,
wherein the heat sink comprises a body in contact with the movable element, a fin structured integrally with the body, and a wall structured integrally with the body and being in contact with the table,
wherein the wall protrudes from a top face of the body, and an end face of the wall in the protruding direction is in contact with an under face of the table, and
wherein the table comprises a first fixed portion, on one side thereof in the direction orthogonal to the travel direction of the movement unit, and a second fixed portion, on another side thereof in the direction orthogonal to the travel direction of the movement unit, the first fixed portion fixed to one of the pair of movement blocks, the second fixed portion fixed to another of the pair of movement blocks, the table made of a material having a low thermal expansion coefficient.

2. The drive guide apparatus according to claim 1, wherein the heat sink is fixed to an under face of the table.

3. The drive guide apparatus according to claim 1, wherein a thermal expansion coefficient of the table is $10.0 \times (10^{-6}$/K) or less.

4. The drive guide apparatus according to claim 1, wherein a black surface process is performed on the table.

* * * * *